US008879826B2

(12) United States Patent
Kwon (10) Patent No.: US 8,879,826 B2
(45) Date of Patent: Nov. 4, 2014

(54) METHOD, SYSTEM AND COMPUTER PROGRAM PRODUCT FOR SWITCHING BETWEEN 2D AND 3D CODING OF A VIDEO SEQUENCE OF IMAGES

(75) Inventor: Do-Kyoung Kwon, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 210 days.

(21) Appl. No.: 13/535,580

(22) Filed: Jun. 28, 2012

(65) Prior Publication Data

US 2013/0011047 A1 Jan. 10, 2013

Related U.S. Application Data (60) Provisional application No. 61/504,458, filed on Jul. 5, 2011.

(51) Int. Cl.
*G06K 9/00* (2006.01)
*H04N 19/142* (2014.01)
*H04N 19/103* (2014.01)
*H04N 19/114* (2014.01)
*H04N 19/107* (2014.01)
*H04N 19/62* (2014.01)

(52) U.S. Cl.
CPC ...... *G06K 9/00765* (2013.01); *H04N 19/00054* (2013.01); *H04N 19/00163* (2013.01); *H04N 19/0003* (2013.01); *H04N 19/00018* (2013.01); *H04N 19/00806* (2013.01)
USPC ........................................ 382/154

(58) Field of Classification Search
None
See application file for complete search history.

(56) References Cited

U.S. PATENT DOCUMENTS

| | | | |
|---|---|---|---|
| 6,614,927 B1 * | 9/2003 | Tabata | 382/154 |
| 2006/0126919 A1 * | 6/2006 | Kitaura et al. | 382/154 |
| 2007/0177813 A1 * | 8/2007 | Yang | 382/233 |
| 2008/0104647 A1 * | 5/2008 | Hannuksela | 725/114 |
| 2010/0020871 A1 * | 1/2010 | Hannuksela et al. | 375/240.12 |
| 2011/0063409 A1 * | 3/2011 | Hannuksela | 348/42 |
| 2011/0109731 A1 * | 5/2011 | Koo et al. | 348/51 |
| 2011/0261160 A1 * | 10/2011 | Tadokoro et al. | 348/46 |
| 2012/0002022 A1 * | 1/2012 | Ohgose et al. | 348/51 |
| 2012/0014442 A1 * | 1/2012 | Takahashi et al. | 375/240.12 |
| 2012/0038743 A1 * | 2/2012 | Su et al. | 348/43 |

OTHER PUBLICATIONS

Tourapis et al., "Direct Mode Coding for Bipredictive Slices in the H.264 Standard", IEEE Transactions on Circuits and Systems for Video Technology, vol. 15, No. 1, Jan. 2005, pp. 119-126, IEEE.

Vetro et al., "Overview of the Stereo and Multiview Video Coding Extensions of the H.264/MPEG-4 AVC Standard", Proceedings of the IEEE (2011), Jan. 2011, pp. 1-17, Mitsubishi Electric Research Laboratories, Cambridge, MA.

* cited by examiner

*Primary Examiner* — Atiba O Fitzpatrick
*Assistant Examiner* — Carol Wang
(74) *Attorney, Agent, or Firm* — Michael A. Davis, Jr.; Frederick J. Telecky, Jr.

(57) ABSTRACT

A video sequence of images includes at least first and second images. In response to at least first and second conditions being satisfied, an encoding mode is switched between two-dimensional video coding and three-dimensional video coding. The first condition is that the second image represents a scene change in comparison to the first image. The second image is encoded according to the switched encoding mode.

30 Claims, 4 Drawing Sheets

METHOD, SYSTEM AND COMPUTER PROGRAM PRODUCT FOR SWITCHING BETWEEN 2D AND 3D CODING OF A VIDEO SEQUENCE OF IMAGES

CROSS-REFERENCE TO RELATED APPLICATION

This application claims priority to U.S. Provisional Patent Application Ser. No. 61/504,458, filed Jul. 5, 2011, entitled 3D VIDEO CODING WITH SCENE ADAPTIVE 2D TO 3D SWITCHING, naming Do-Kyoung Kwon as inventor, which is hereby fully incorporated herein by reference for all purposes.

BACKGROUND

The disclosures herein relate in general to digital image processing, and in particular to a method, system and computer program product for switching between 2D and 3D coding of a video sequence of images.

A stereoscopic image is formed by a left view and its associated (temporally co-located) right view, which correspond to one another as a matched pair of views. For asymmetric three-dimensional ("3D") video coding of a stereoscopic image: (a) a lower bitrate may be achieved by encoding one of the views (e.g., either the left view or the right view) at a lower resolution; and (b) overall sharpness may be dominated by the other view, which is encoded at a higher resolution. Nevertheless, asymmetric 3D video coding may introduce various types of artifacts (e.g., blocking and smoothing), which can diminish such coding's quality. For example, such diminished quality can strain the human's viewing of a corresponding decoded image with 3D effect on a stereoscopic display screen, thereby causing the human's eventual discomfort (e.g., headaches and/or eye muscle pain).

SUMMARY

A video sequence of images includes at least first and second images. In response to at least first and second conditions being satisfied, an encoding mode is switched between two-dimensional video coding and three-dimensional video coding. The first condition is that the second image represents a scene change in comparison to the first image. The second image is encoded according to the switched encoding mode.

DETAILED DESCRIPTION

Figure 1:
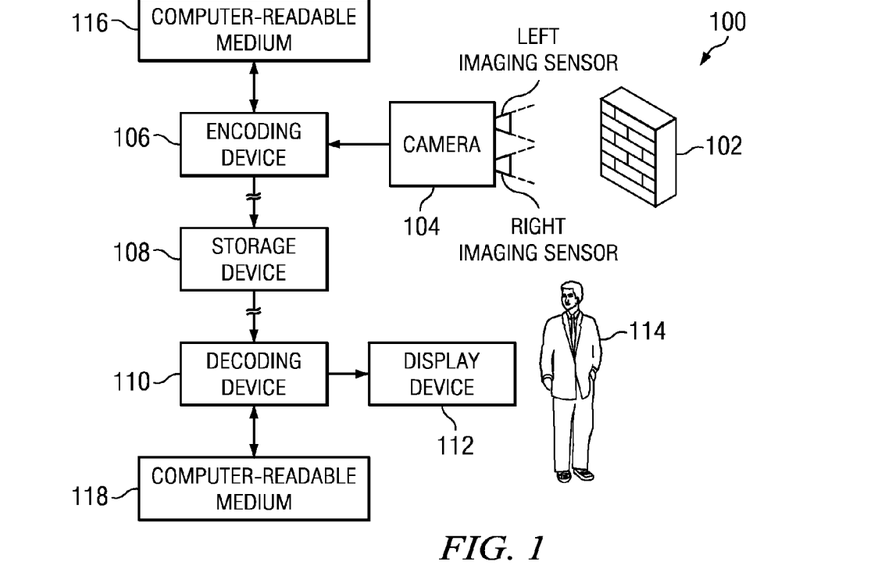
FIG. 1 is a block diagram of an information handling system of the illustrative embodiments.

FIG. 1 is a block diagram of an information handling system (e.g., a portable battery-powered electronics device, such as a mobile smartphone, a tablet computing device, a netbook computer, or a laptop computer), indicated generally at 100, of the illustrative embodiments. In the example of FIG. 1, a scene (e.g., including a physical object 102 and its surrounding foreground and background) is viewed by a stereoscopic camera system 104, which: (a) digitizes images of such views; and (b) outputs a video sequence of such digitized (or "digital") images to an encoding device 106. As shown in FIG. 1, the camera system 104 includes dual imaging sensors, which are horizontally offset from one another, namely: (a) a left imaging sensor for digitizing and outputting (to the encoding device 106) a left image of a view for a human's left eye; and (b) a right imaging sensor for digitizing and outputting (to the encoding device 106) a right image of a view for the human's right eye.

From the camera system 104, the encoding device 106 receives such images. The encoding device 106 encodes such images into a binary logic bit stream. Also, the encoding device 106 outputs the bit stream to a storage device 108, which receives and stores the bit stream.

A decoding device 110 reads the bit stream from the storage device 108. In response to the bit stream, the decoding device 110 decodes the bit stream into such images. Also, the decoding device 110 outputs such images to a display device 112 for display to a human user 114. The display device 112: (a) receives such images from the decoding device 110 (e.g., in response to a command that the user 114 specifies via a touchscreen of the display device 112); and (b) in response thereto, displays such images (e.g., stereoscopic images of the object 102 and its surrounding foreground and background), which are viewable by the user 114.

The display device 112 is a stereoscopic display whose optical components enable viewing with 3D effect. In one example, the display device 112 displays such images (e.g., anaglyph images) with 3D effect for viewing by the user 114 through special glasses that: (a) filter the left image against being seen by a right eye of the user 114; and (b) filter the right image against being seen by a left eye of the user 114. In another example, the display device 112 is a stereoscopic 3D liquid crystal display device or a stereoscopic 3D organic electroluminescent display device, which displays such images with 3D effect for viewing by the user 114 without relying on special glasses.

The encoding device 106 performs its operations in response to instructions of a computer-readable program that is stored on a computer-readable medium 116 (e.g., hard disk drive, flash memory card, or other nonvolatile storage device). Also, the computer-readable medium 116 stores a database of information for operations of the encoding device 106. Similarly, the decoding device 110 performs its operations in response to instructions of a computer-readable program that is stored on a computer-readable medium 118. Also, the computer-readable medium 118 stores a database of information for operations of the decoding device 110.

In an alternative embodiment: (a) the encoding device 106 outputs the bit stream directly to the decoding device 110 via a communication channel (e.g., Ethernet, Internet, or wireless communication channel); and (b) accordingly, the decoding device 110 receives and processes the bit stream directly from the encoding device 106 in real-time. In such alternative embodiment, the storage device 108 either: (a) concurrently receives (in parallel with the decoding device 110) and stores the bit stream from the encoding device 106; or (b) is absent from the system 100. The system 100 is formed by electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs").

Figure 2:
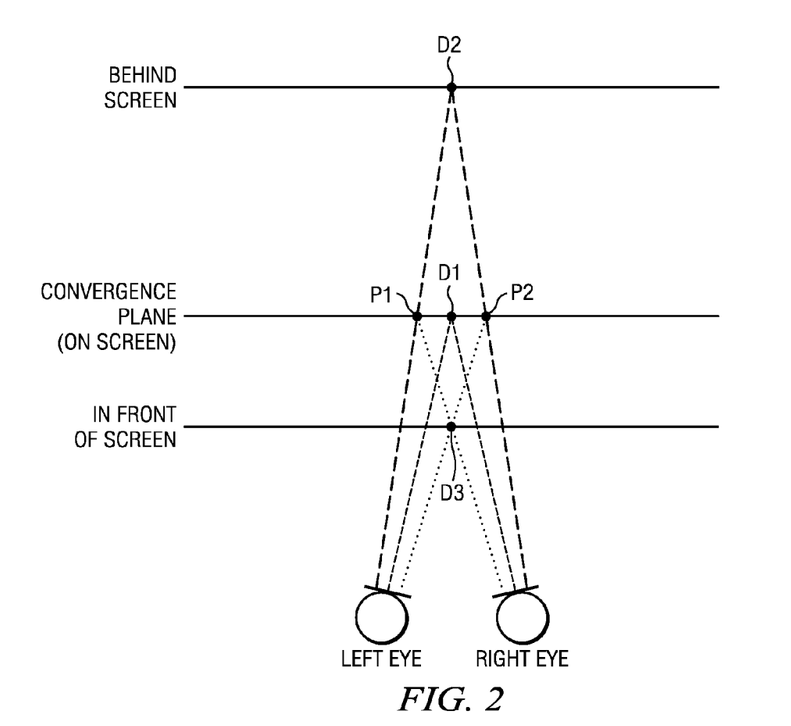
FIG. 2 is a diagram of viewing axes of a human's left and right eyes.

FIG. 2 is a diagram of viewing axes of left and right eyes of the user 114. In the example of FIG. 2, a stereoscopic image is displayed by the display device 112 on a screen (which is a convergence plane where viewing axes of the left and right eyes naturally converge to intersect). The user 114 experiences the 3D effect by viewing the image on the display device 112, so that various features (e.g., objects) appear on the screen (e.g., at a point D1), behind the screen (e.g., at a point D2), and/or in front of the screen (e.g., at a point D3).

Within the stereoscopic image, a feature's disparity is a horizontal shift between: (a) such feature's location within the left image; and (b) such feature's corresponding location within the right image. For example, if a feature (within the stereoscopic image) is horizontally centered on the point D1 within the left image, and likewise horizontally centered on the point D1 within the right image, then: (a) such feature's disparity=D1–D1=0; and (b) the user 114 will perceive the feature to appear at the point D1 with zero horizontal disparity on the screen, which is a natural convergence distance away from the left and right eyes.

By comparison, if the feature is horizontally centered on a point P1 within the left image, and horizontally centered on a point P2 within the right image, then: (a) such feature's disparity=P2–P1; and (b) the user 114 will perceive the feature to appear at the point D2 with positive disparity behind the screen, which is greater than the natural convergence distance away from the left and right eyes. Conversely, if the feature is horizontally centered on the point P2 within the left image, and horizontally centered on the point P1 within the right image, then: (a) such feature's disparity=P1–P2; and (b) the user 114 will perceive the feature to appear at the point D3 with negative disparity in front of the screen, which is less than the natural convergence distance away from the left and right eyes. The amount of the feature's disparity (e.g., horizontal shift of the feature from P1 within the left image to P2 within the right image) is measurable as a number of pixels, so that: (a) positive disparity is represented as a positive number; and (b) negative disparity is represented as a negative number.

Figure 3A:
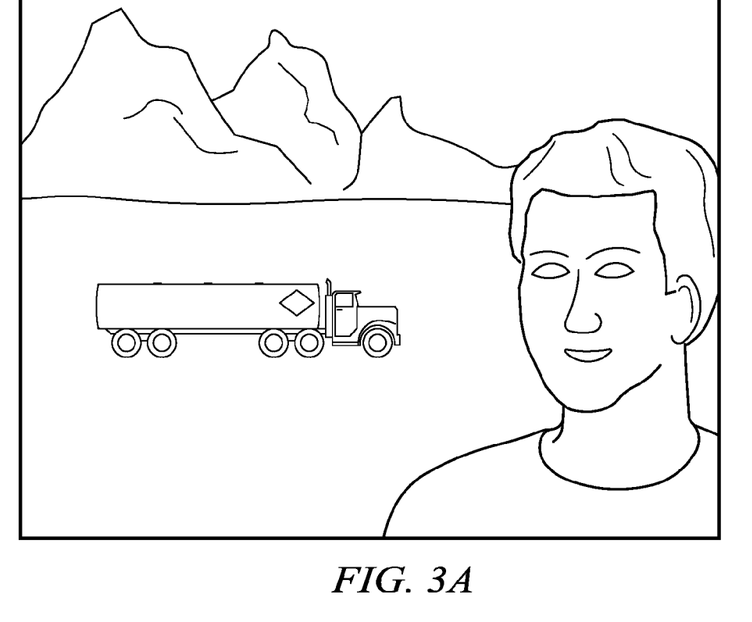
FIG. 3A is a diagram of a left image for viewing by the human's left eye on a display device of the system of FIG. 1.
Figure 3B:
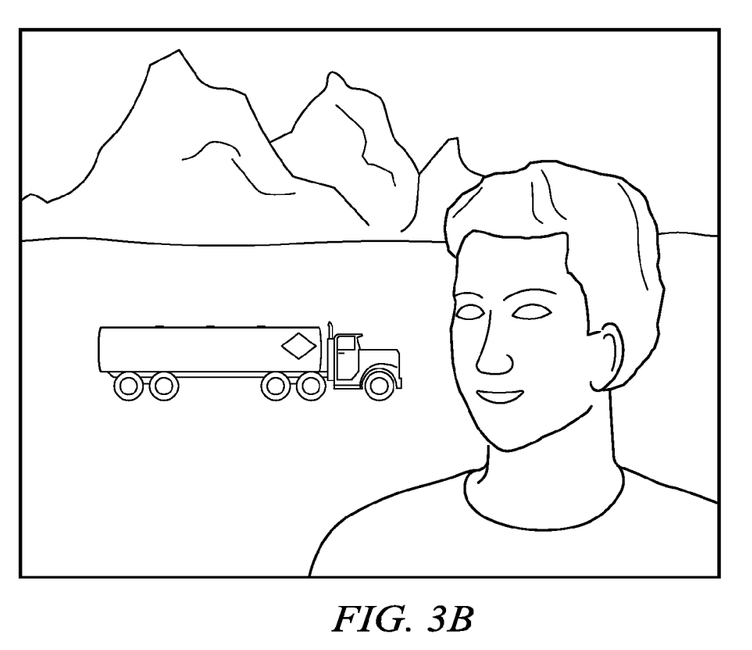
FIG. 3B is a diagram of a right image for viewing by the human's right eye on the display device.

FIG. 3A is a diagram of a left image for viewing by the left eye (of the user 114) on the display device 112. FIG. 3B is a diagram of a right image for viewing by the right eye (of the user 114) on the display device 112. Accordingly, the left image (FIG. 3A) and its associated right image (FIG. 3B) are a matched pair of left and right images, which correspond to one another, and which together form a stereoscopic image for display to the user 114 on the screen of the display device 112.

The matched pair of left and right images are temporally co-located, because they are contemporaneously (e.g., simultaneously) digitized and output (to the encoding device 106) by the left and right imaging sensors, respectively. Portions of the image (e.g., features, such as objects, within the image) include a mountain range, a truck, and a person's face. Because the truck is horizontally centered on the same coordinate in both of the left and right images (of FIGS. 3A and 3B), the user 114 will perceive the truck to appear on the screen, which is a natural convergence distance away from the left and right eyes.

By comparison, the mountain range within the left image of FIG. 3A is left of the mountain range within the right image of FIG. 3B. As discussed hereinabove in connection with FIG. 2, if a feature (e.g., at the point P1 in FIG. 2) within the left image is left of the same feature (e.g., at the point P2 in FIG. 2) within the right image, then the user 114 will perceive such feature to appear behind the screen. Accordingly, the user 114 will perceive the mountain range (of FIGS. 3A and 3B) to appear behind the screen.

Conversely, the person's face within the left image of FIG. 3A is right of the person's face within the right image of FIG. 3B. As discussed hereinabove in connection with FIG. 2, if a feature (e.g., at the point P2 in FIG. 2) within the left image is right of the same feature (e.g., at the point P1 in FIG. 2) within the right image, then the user 114 will perceive such feature to appear in front of the screen. Accordingly, the user 114 will perceive the person's face (of FIGS. 3A and 3B) to appear in front of the screen.

Figure 4:
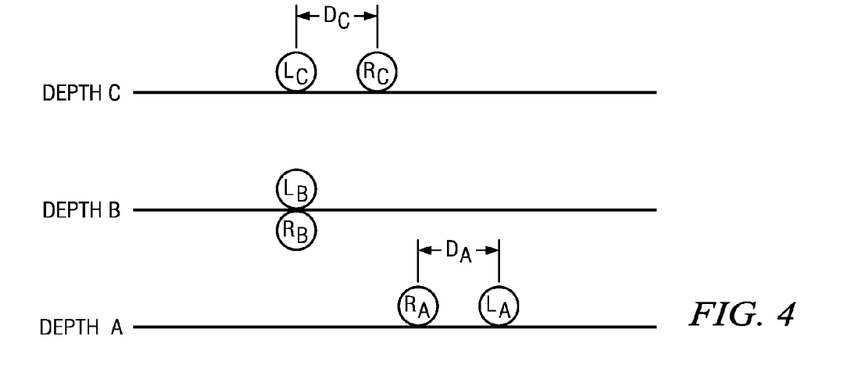
FIG. 4 is a diagram of features at various depths within the stereoscopic image of FIGS. 3A and 3B.

FIG. 4 is a diagram of features at various depths within the stereoscopic image of FIGS. 3A and 3B. Such depths are proportional to disparities of such features. For example, within the image of FIGS. 3A and 3B, features include: (a) the person's face at a depth A, which is horizontally centered on a variable point $L_A$ within the left image (FIG. 3A) and horizontally centered on a variable point $R_A$ within the right image (FIG. 3B), where a disparity $D_A = R_A - L_A < 0$ (so the user 114 will perceive the person's face to appear in front of the screen); (b) the truck at a depth B, which is horizontally centered on a variable point $L_B$ within the left image (FIG. 3A) and horizontally centered on a variable point $R_B$ within the right image (FIG. 3B), where a disparity $D_B = R_B - L_B = 0$ (so the user 114 will perceive the truck to appear on the screen); and (c) the mountain range at a depth C, which is horizontally centered on a variable point $L_C$ within the left image (FIG. 3A) and horizontally centered on a variable point $R_C$ within the right image (FIG. 3B), where a disparity $D_C = R_C - L_C > 0$ (so the user 114 will perceive the mountain range to appear behind the screen). Accordingly, in the example of FIGS. 3A, 3B and 4, the convergence plane is located at the depth B.

Figure 5:
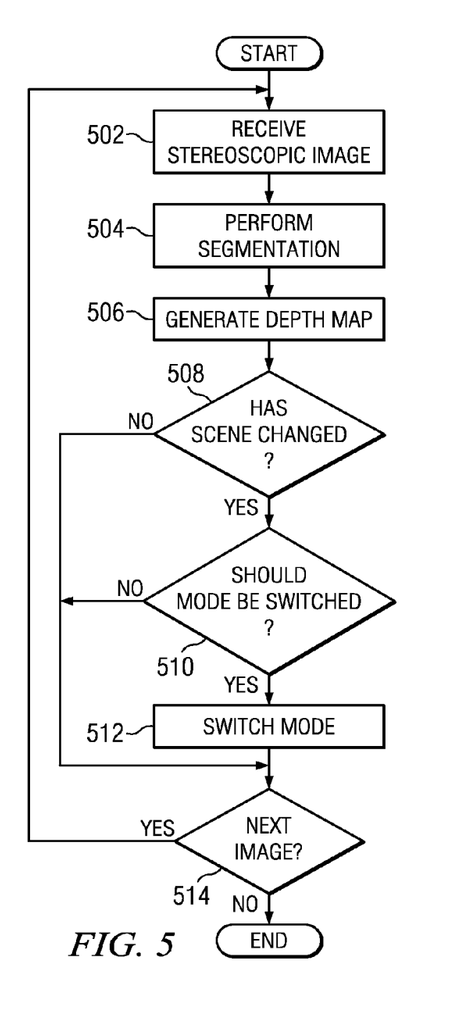
FIG. 5 is a flowchart of operation of an encoding device of the system of FIG. 1 in a first embodiment.

FIG. 5 is a flowchart of operation of the encoding device 106 in a first embodiment. The operation begins at a step 502, at which the encoding device 106 receives a stereoscopic image from the camera system 104. At a next step 504, in response to the database of information (e.g., training information) from the computer-readable medium 116, the encoding device 106: (a) detects and classifies various low level features (e.g., colors, edges, textures, focus/blur, object sizes, gradients, and positions) and high level features (e.g., faces, bodies, sky, foliage, and other objects) within the stereoscopic image; and (b) performs a mean shift clustering operation to segment the stereoscopic image into regions.

At a next step 506, in response to disparities of such features, and in response to such information from the computer-readable medium 116, the encoding device 106 generates a depth map that assigns suitable depth values to such regions within the stereoscopic image. Each region includes its own group of respective pixels, so that all pixels (within such region) have such region's depth value in the depth map. At a next step 508, in response to respective depth maps of the stereoscopic image and its immediately preceding stereoscopic image, the encoding device 106 determines whether the stereoscopic image represents a scene change (e.g., discontinuity in time and/or location) in comparison to its immediately preceding stereoscopic image.

In response to occurrence of a scene change, the operation continues from the step 508 to a step 510, at which the encoding device 106 determines whether an encoding mode should be switched between 2D video coding and 3D video coding. In one embodiment, the encoding device 106 analyzes the depth map (which was generated by the encoding device 106 at the step 506) to determine whether the encoding mode should be switched between 2D video coding and 3D video coding. For example, in such embodiment: (a) in response to the depth map's indication that the stereoscopic image's range of depth is higher than a threshold, the encoding device 106 determines that 3D video coding is better for the encoding mode, because the higher range of depth indicates that quality of 3D effect is more important than achieving a lower bitrate; and (b) by comparison, in response to the depth map's indication that the stereoscopic image's range of depth is lower than (or equal to) the threshold, the encoding device 106 determines that 2D video coding is better for the encoding mode, because the lower range of depth indicates that achieving a lower bitrate is more important than quality of 3D effect.

In another embodiment, the encoding device 106: (a) computes a duration of time that has elapsed since the encoding mode was most recently switched between 2D video coding and 3D video coding; and (b) analyzes such duration of time (instead of, or in combination with, analyzing the depth map) to determine whether the encoding mode should be switched between 2D video coding and 3D video coding. For example, if at least a threshold duration of time has elapsed since the encoding mode was most recently switched to 3D video coding, then switching to 2D video coding can avoid causing excessive eye strain and fatigue of the user 114 in viewing the images on the screen of the display device 112. By comparison, if at least a threshold duration of time has elapsed since the encoding mode was most recently switched to 2D video coding, then switching to 3D video coding can occur without causing such excessive eye strain and fatigue.

In response to determining that the encoding mode should be switched between 2D video coding and 3D video coding, the operation continues from the step 510 to a step 512, at which the encoding device 106 switches the encoding mode between 2D video coding and 3D video coding. Accuracy is important for the determination (by the encoding device 106 at the step 508) of whether the stereoscopic image represents a scene change in comparison to its immediately preceding stereoscopic image, because geometric flickering can result if the encoding mode is switched between 2D video coding and 3D video coding within a scene.

After the step 512, the operation continues to a step 514, at which the encoding device 106 encodes the stereoscopic image according to the then-current encoding mode (either 2D video coding or 3D video coding) and determines whether a next stereoscopic image remains to be encoded. In response to the encoding device 106 determining that a next stereoscopic image remains to be encoded, the operation returns from the step 514 to the step 502 for encoding of such next stereoscopic image. Conversely, in response to the encoding device 106 determining that a next stereoscopic image does not remain to be encoded, the operation ends.

Referring again to the step 508, in response to the encoding device 106 determining that the stereoscopic image does not represent a scene change in comparison to its immediately preceding stereoscopic image, the operation continues from the step 508 to the step 514. Similarly, in response to the encoding device 106 determining that the encoding mode should not be switched between 2D video coding and 3D video coding, the operation continues from the step 510 to the step 514.

Figure 6:
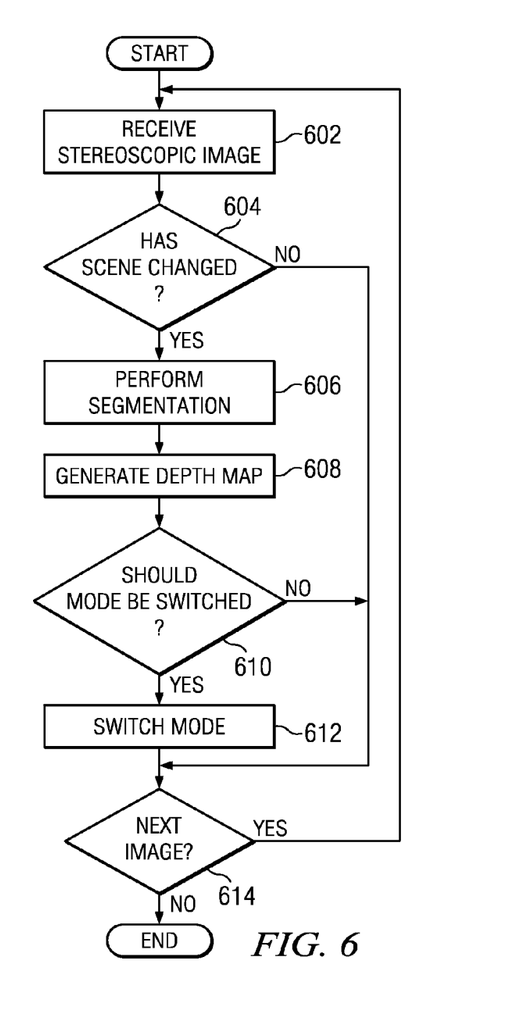
FIG. 6 is a flowchart of operation of the encoding device of the system of FIG. 1 in a second embodiment.

FIG. 6 is a flowchart of operation of the encoding device 106 in a second embodiment. The operation begins at a step 602, at which the encoding device 106 receives a stereoscopic image from the camera system 104. At a next step 604, in response to information other than a depth map, the encoding device 106 determines whether the stereoscopic image represents a scene change in comparison to its immediately preceding stereoscopic image. In one example, the encoding device 106 performs such determination (at the step 604) in response to one or more low level features and/or high level features of the left image and/or right image, even without generating a depth map. In that manner, the encoding device 106 consumes fewer computational resources for performing such determination (at the step 604).

In response to occurrence of a scene change, the operation continues from the step 604 to a next step 606. At the step 606, in response to the database of information (e.g., training information) from the computer-readable medium 116, the encoding device 106: (a) detects and classifies various low level features (e.g., colors, edges, textures, focus/blur, object sizes, gradients, and positions) and high level features (e.g., faces, bodies, sky, foliage, and other objects) within the stereoscopic image; and (b) performs a mean shift clustering operation to segment the stereoscopic image into regions. At a next step 608, in response to disparities of such features, and in response to such information from the computer-readable medium 116, the encoding device 106 generates a depth map that assigns suitable depth values to such regions within the stereoscopic image. Accordingly, in the second embodiment (FIG. 6), the encoding device 106 generates the depth map in response to occurrence of a scene change (instead of before the step 604).

At a next step 610, the encoding device 106 determines whether an encoding mode should be switched between 2D video coding and 3D video coding (e.g., in the same manner as discussed hereinabove in connection with the step 510 of FIG. 5). In an alternative version of the second embodiment, the encoding device 106: (a) computes a duration of time that has elapsed since the encoding mode was most recently switched between 2D video coding and 3D video coding; (b) analyzes such duration of time (instead of analyzing the depth map) to determine whether the encoding mode should be switched between 2D video coding and 3D video coding; and (c) accordingly, skips the steps 606 and 608, so that the encoding device 106 consumes fewer computational resources for performing such determination (at the step 610).

In response to determining that the encoding mode should be switched between 2D video coding and 3D video coding, the operation continues from the step 610 to a step 612, at which the encoding device 106 switches the encoding mode between 2D video coding and 3D video coding. Accuracy is important for the determination (by the encoding device 106 at the step 604) of whether the stereoscopic image represents a scene change in comparison to its immediately preceding stereoscopic image, because geometric flickering can result if the encoding mode is switched between 2D video coding and 3D video coding within a scene.

After the step 612, the operation continues to a step 614, at which the encoding device 106 encodes the stereoscopic image according to the then-current encoding mode (either 2D video coding or 3D video coding) and determines whether a next stereoscopic image remains to be encoded. In response to the encoding device 106 determining that a next stereoscopic image remains to be encoded, the operation returns from the step 614 to the step 602 for encoding of such next stereoscopic image. Conversely, in response to the encoding device 106 determining that a next stereoscopic image does not remain to be encoded, the operation ends.

Referring again to the step 604, in response to the encoding device 106 determining that the stereoscopic image does not represent a scene change in comparison to its immediately preceding stereoscopic image, the operation continues from the step 604 to the step 614. Similarly, in response to the encoding device 106 determining that the encoding mode should not be switched between 2D video coding and 3D video coding, the operation continues from the step 610 to the step 614.

Figure 7:
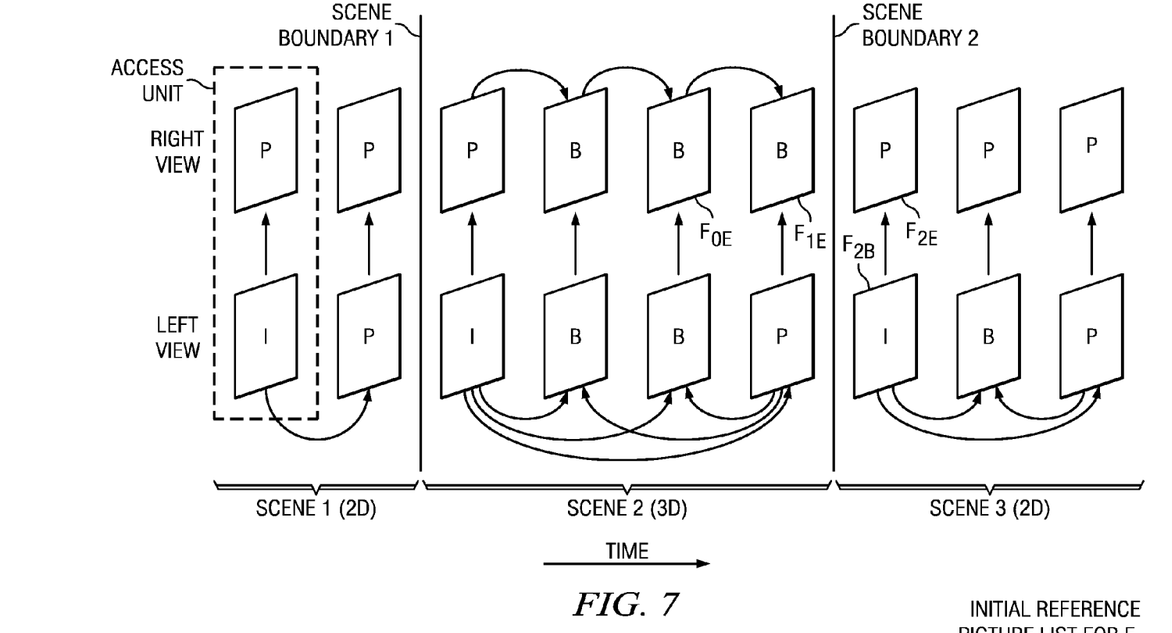
FIG. 7 is a diagram of an example video sequence of stereoscopic images after encoding by the encoding device of the system of FIG. 1.

FIG. 7 is a diagram of an example video sequence of stereoscopic images after encoding by the encoding device 106. In FIG. 7, an access unit is formed by a stereoscopic image's left view and its corresponding (temporally co-located) right view. Accordingly, FIG. 7 shows a total of nine access units, including a first access unit that is outlined by a dashed enclosure for clarity. The left view is the base view, and the right view is the enhancement view.

In the example of FIG. 7, the encoding device 106 encodes a scene 1 with 2D video coding, a scene 2 with 3D video coding, and a scene 3 with 2D video coding. The scene 1 includes two access units, the scene 2 includes four access units, and the scene 3 includes three access units. As determined by the encoding device 106 at the step 508 (FIG. 5) or the step 604 (FIG. 6): (a) the scene 1 and the scene 2 are separated by a scene boundary 1; and (b) the scene 2 and the scene 3 are separated by a scene boundary 2. Moreover, as determined by the encoding device 106 at the step 510 (FIG. 5) or the step 610 (FIG. 6), the encoding mode was switched: (a) from 2D video coding to 3D video coding at the scene boundary 1; and (b) from 3D video coding to 2D video coding at the scene boundary 2.

In FIG. 7: (a) if a left view is intra coded ("I-frame"), then such I-frame is identified by an "I" label; (b) if a left view or a right view is predictive coded ("P-frame"), then such P-frame is identified by a "P" label; and (c) if a left view or a right view is bidirectionally predictive coded ("B-frame"), then such B-frame is identified by a "B" label. The decoding device 110 decodes each I-frame in response to information that the encoding device 106 encodes for such I-frame. Also, the decoding device 110 decodes each P-frame in response to: (a) information that the encoding device 106 encodes for such P-frame; and (b) a previously decoded I-frame, P-frame or B-frame, as indicated by an applicable one of the arrows in FIG. 7. Further, the decoding device 110 decodes each B-frame in response to: (a) information that the encoding device 106 encodes for such B-frame; (b) a first previously decoded I-frame, P-frame or B-frame, as indicated by an applicable one of the arrows in FIG. 7; and (c) a second previously decoded I-frame, P-frame or B-frame, as indicated by an applicable one of the arrows in FIG. 7.

In compliance with the multiview video coding ("MVC") amendment to the MPEG-4 advanced video coding ("AVC") H.264 standard, if the encoding device 106 switches the encoding mode between 2D video coding and 3D video coding, then the encoding device 106: (a) ends a first group of pictures ("GOP") immediately before the encoding mode is switched; (b) starts a second GOP immediately after the encoding mode is switched; and (c) ends the second GOP immediately before the encoding mode is next switched. Accordingly, the encoding device 106 encodes a scene with 3D video coding by: (a) encoding the scene's base views as I-frames, P-frames and/or B-frames; and (b) encoding the scene's enhancement views as I-frames, P-frames and/or B-frames.

Further, in compliance with such MVC amendment, the encoding device 106 encodes a scene with 2D video coding by: (a) encoding the scene's base views as I-frames, P-frames and/or B-frames; and (b) encoding the scene's enhancement views as P-frames in the H.264 standard's SKIP mode, so that an access unit's enhancement view is encoded (and subsequently decoded) as being identical to such access unit's base view. For encoding (or subsequently decoding) an access unit's enhancement view as a P-frame in the H.264 standard's SKIP mode, so that such access unit's enhancement view is encoded (and subsequently decoded) as being identical to such access unit's base view, the encoding device 106 (or subsequently the decoding device 110) reorders the initial reference picture list for such access unit's enhancement view, so that such access unit's base view is identified at the first index in the reordered reference picture list. In the example of FIG. 7, a scene's first base view is an I-frame.

Figure 8:
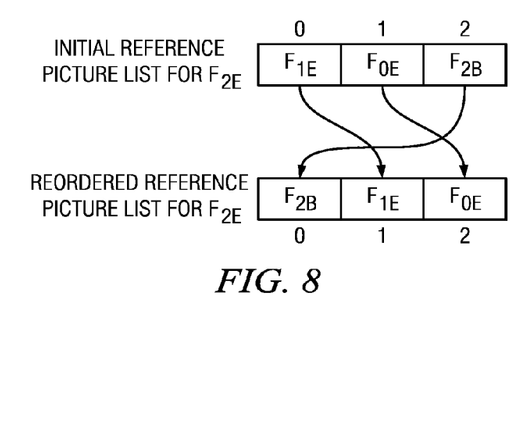
FIG. 8 is a diagram of initial and reordered reference picture lists for a representative one of the images of FIG. 7.

FIG. 8 is a diagram of initial and reordered reference picture lists for encoding (or subsequently decoding) an enhancement view $F_{2E}$ of FIG. 7. As shown in FIG. 8, the initial reference picture list (for $F_{2E}$) identifies views $F_{1E}$, $F_{0E}$ and $F_{2B}$ at index 0 (which is the first index), index 1 and index 2, respectively. By comparison, after the encoding device 106 (or subsequently the decoding device 110) reorders such reference picture list, the reordered reference picture list (for $F_{2E}$) identifies views $F_{2B}$, $F_{1E}$ and $F_{0E}$ at index 0, index 1 and index 2, respectively.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by an information handling system for encoding a video sequence of images, including at least first and second images, the method comprising:
   in response to at least first and second conditions being satisfied, switching an encoding mode between two-dimensional video coding and three-dimensional video coding, wherein the first condition is that the second image represents a scene change in comparison to the first image; and
   encoding the second image according to the switched encoding mode;
   wherein the second condition is one of: that a range of depth of the second image is higher than a threshold range of depth; and that the range of depth of the second image is not higher than the threshold range of depth;
   wherein, if the second condition is that the range of depth of the second image is higher than the threshold range of depth, then the encoding mode is switched from two-dimensional video coding to three-dimensional video coding in response to at least the first and second conditions being satisfied; and
   wherein, if the second condition is that the range of depth of the second image is not higher than the threshold range of depth, then the encoding mode is switched from three-dimensional video coding to two-dimensional video coding in response to at least the first and second conditions being satisfied.

2. The method of claim 1, and comprising:
   generating respective depth maps of the first and second images; and
   in response to the depth maps, determining whether the second image represents the scene change in comparison to the first image.

3. The method of claim 1, wherein a third condition is that at least a threshold duration of time has elapsed since the encoding mode was most recently switched, and wherein the encoding mode is switched between two-dimensional video coding and three-dimensional video coding in response to at least the first, second and third conditions being satisfied.

4. The method of claim 1, wherein the second condition is that the range of depth of the second image is higher than the threshold range of depth, and wherein the encoding mode is switched from two-dimensional video coding to three-dimensional video coding in response to the first and second conditions being satisfied.

5. The method of claim 1, wherein the second condition is that the range of depth of the second image is not higher than the threshold range of depth, and wherein the encoding mode is switched from three-dimensional video coding to two-dimensional video coding in response to the first and second conditions being satisfied.

6. The method of claim 5, and comprising:
   in response to the first condition being satisfied, generating a depth map of the second image; and
   in response to the depth map, determining whether the range of depth of the second image is higher than the threshold range of depth.

7. The method of claim 1, wherein the encoding mode is switched from three-dimensional video coding to two-dimensional video coding, and wherein encoding the second image according to the switched encoding mode includes:
   encoding a base view of the second image; and
   encoding an enhancement view of the second image as being identical to the base view of the second image.

8. The method of claim 7, wherein encoding the enhancement view of the second image includes:
   encoding the enhancement view of the second image as a predictive coded frame.

9. The method of claim 8, wherein encoding the enhancement view of the second image includes:
   reordering a reference picture list for the enhancement view of the second image.

10. The method of claim 1, wherein encoding the second image includes:
    encoding a base view of the second image as an intra coded frame.

11. A system for encoding a video sequence of images, including at least first and second images, the system comprising:
    at least one device for: in response to at least first and second conditions being satisfied, switching an encoding mode between two-dimensional video coding and three-dimensional video coding, wherein the first condition is that the second image represents a scene change in comparison to the first image; and encoding the second image according to the switched encoding mode;
    wherein the second condition is one of: that a range of depth of the second image is higher than a threshold range of depth; and that the range of depth of the second image is not higher than the threshold range of depth;
    wherein, if the second condition is that the range of depth of the second image is higher than the threshold range of depth, then the at least one device is for switching the encoding mode from two-dimensional video coding to three-dimensional video coding in response to at least the first and second conditions being satisfied; and
    wherein, if the second condition is that the range of depth of the second image is not higher than the threshold range of depth, then the at least one device is for switching the encoding mode from three-dimensional video coding to two-dimensional video coding in response to at least the first and second conditions being satisfied.

12. The system of claim 11, wherein the at least one device is for: generating respective depth maps of the first and second images; and, in response to the depth maps, determining whether the second image represents the scene change in comparison to the first image.

13. The system of claim 11, wherein a third condition is that at least a threshold duration of time has elapsed since the encoding mode was most recently switched, and wherein the at least one device is for switching the encoding mode between two-dimensional video coding and three-dimensional video coding in response to at least the first, second and third conditions being satisfied.

14. The system of claim 11, wherein the second condition is that the range of depth of the second image is higher than the threshold range of depth, and wherein the at least one device is for switching the encoding mode from two-dimensional video coding to three-dimensional video coding in response to the first and second conditions being satisfied.

15. The system of claim 11, wherein the second condition is that the range of depth of the second image is not higher than the threshold range of depth, and wherein the at least one device is for switching the encoding mode from three-dimensional video coding to two-dimensional video coding in response to the first and second conditions being satisfied.

16. The system of claim 15, wherein the at least one device is for:
in response to the first condition being satisfied, generating a depth map of the second image; and, in response to the depth map, determining whether the range of depth of the second image is higher than the threshold range of depth.

17. The system of claim 11, wherein the at least one device is for switching the encoding mode from three-dimensional video coding to two-dimensional video coding, and wherein encoding the second image according to the switched encoding mode includes:
encoding a base view of the second image; and
encoding an enhancement view of the second image as being identical to the base view of the second image.

18. The system of claim 17, wherein encoding the enhancement view of the second image includes:
encoding the enhancement view of the second image as a predictive coded frame.

19. The system of claim 18, wherein encoding the enhancement view of the second image includes:
reordering a reference picture list for the enhancement view of the second image.

20. The system of claim 11, wherein encoding the second image includes:
encoding a base view of the second image as an intra coded frame.

21. A computer program product for encoding a video sequence of images, including at least first and second images, the computer program product comprising:
a non-transitory computer-readable storage medium; and
a computer-readable program stored on the non-transitory computer-readable storage medium, wherein the computer-readable program is processable by an information handling system for causing the information handling system to perform operations including: in response to at least first and second conditions being satisfied, switching an encoding mode between two-dimensional video coding and three-dimensional video coding, wherein the first condition is that the second image represents a scene change in comparison to the first image; and encoding the second image according to the switched encoding mode;
wherein the second condition is one of: that a range of depth of the second image is higher than a threshold range of depth; and that the range of depth of the second image is not higher than the threshold range of depth;
wherein, if the second condition is that the range of depth of the second image is higher than the threshold range of depth, then the operations include switching the encoding mode from two-dimensional video coding to three-dimensional video coding in response to at least the first and second conditions being satisfied; and
wherein, if the second condition is that the range of depth of the second image is not higher than the threshold range of depth, then the operations include switching the encoding mode from three-dimensional video coding to two-dimensional video coding in response to at least the first and second conditions being satisfied.

22. The computer program product of claim 21, wherein the operations include: generating respective depth maps of the first and second images; and, in response to the depth maps, determining whether the second image represents the scene change in comparison to the first image.

23. The computer program product of claim 21, wherein a third condition is that at least a threshold duration of time has elapsed since the encoding mode was most recently switched, and wherein the operations include switching the encoding mode between two-dimensional video coding and three-dimensional video coding in response to at least the first, second and third conditions being satisfied.

24. The computer program product of claim 21, wherein the second condition is that the range of depth of the second image is higher than the threshold range of depth, and wherein the operations include switching the encoding mode from two-dimensional video coding to three-dimensional video coding in response to the first and second conditions being satisfied.

25. The computer program product of claim 21, wherein the second condition is that the range of depth of the second image is not higher than the threshold range of depth, and wherein the operations include switching the encoding mode from three-dimensional video coding to two-dimensional video coding in response to the first and second conditions being satisfied.

26. The computer program product of claim 25, wherein the operations include: in response to the first condition being satisfied, generating a depth map of the second image; and, in response to the depth map, determining whether the range of depth of the second image is higher than the threshold range of depth.

27. The computer program product of claim 21, wherein the operations include switching the encoding mode from three-dimensional video coding to two-dimensional video coding, and wherein encoding the second image according to the switched encoding mode includes:
encoding a base view of the second image; and
encoding an enhancement view of the second image as being identical to the base view of the second image.

28. The computer program product of claim 27, wherein encoding the enhancement view of the second image includes:
encoding the enhancement view of the second image as a predictive coded frame.

29. The computer program product of claim 28, wherein encoding the enhancement view of the second image includes:
reordering a reference picture list for the enhancement view of the second image.

30. The computer program product of claim 21, wherein encoding the second image includes:
encoding a base view of the second image as an intra coded frame.

* * * * *